United States Patent
Kreuzer et al.

(10) Patent No.: US 7,290,789 B2
(45) Date of Patent: Nov. 6, 2007

(54) VEHICLE STEERING DEVICE WITH STATIONARY CENTRAL PART

(75) Inventors: Martin Kreuzer, Kleinwallstadt (DE);
Ralph Frisch, Moembris (DE); René Neumann, Wehrheim (DE); Stefan Faeth, Aschaffenburg (DE);
Heinz-Joerg Lefringhausen, Mainhausen (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 405 days.

(21) Appl. No.: 10/897,265

(22) Filed: Jul. 21, 2004

(65) Prior Publication Data
US 2005/0017482 A1    Jan. 27, 2005

(30) Foreign Application Priority Data
Jul. 22, 2003    (DE) .......................... 203 11 255 U
May 12, 2004    (DE) ................. 20 2004 007 617 U

(51) Int. Cl.
*B60R 21/16*    (2006.01)
(52) U.S. Cl. .................................... 280/728.2; 280/731
(58) Field of Classification Search ............. 280/728.2, 280/731
See application file for complete search history.

(56) References Cited

U.S. PATENT DOCUMENTS

| | | |
|---|---|---|
| 4,604,912 A | 8/1986 | Sugita et al. |
| 5,593,310 A | 1/1997 | Kawamoto et al. |
| 5,882,032 A | 3/1999 | Fischer |
| 6,129,374 A | 10/2000 | Yamada et al. |
| 6,893,044 B2 * | 5/2005 | Holmes et al. ............. 280/731 |

FOREIGN PATENT DOCUMENTS

| | | |
|---|---|---|
| DE | 2131902 | 6/1971 |
| DE | 3406327 | 9/1984 |
| DE | 4446901 | 6/1995 |
| DE | 29616892 | 3/1997 |
| DE | 19704335 | 8/1997 |
| DE | 69904983 | 1/2003 |
| EP | 0243047 | 10/1987 |
| EP | 0414245 | 2/1991 |

* cited by examiner

*Primary Examiner*—Paul N. Dickson
*Assistant Examiner*—Robert Coker
(74) *Attorney, Agent, or Firm*—Tarolli, Sundheim, Covell & Tummino LLP

(57) ABSTRACT

A vehicle steering device includes a steering wheel part coupled non-rotatably to a steering column and a central part which is stationary with regard to a rotation of the steering wheel part. The steering device further includes a gas bag module including a gas generator unit. The gas generator unit in the installed state of the gas bag module is a component of the steering wheel part. Another vehicle steering device also includes a steering wheel part coupled non-rotatably to a steering column and a central part which is stationary with respect to a rotation of the steering part. A gas bag module including a gas generator unit is housed in the stationary central part. The gas generator unit is connected electrically via a supply line with a control unit arranged outside the steering device. The supply line is guided from a first clock spring arranged in a stationary section of the steering device via a second clock spring arranged in the rotatable steering wheel part to the gas generator unit.

16 Claims, 4 Drawing Sheets

VEHICLE STEERING DEVICE WITH STATIONARY CENTRAL PART

TECHNICAL FIELD

The invention relates to a vehicle steering device, in particular to a vehicle steering device with a stationary central part.

BACKGROUND OF THE INVENTION

From German and European Published Applications DE 2 131 902 and EP 0 414 245 A1, respectively, vehicle steering devices are known, which comprise a steering wheel part coupled non-rotatably to a steering column, and a central part which is stationary with regard to a rotation of the steering wheel part. The known gas bag modules include a gas generator unit and are housed in the stationary central part. The gas generator unit is connected electrically via a supply line with a control unit arranged outside the steering device. Such steering devices basically have the advantage that operating elements arranged on the central part are always to be found at the same place irrespective of the steering wheel position. In steering devices with a gas bag module housed in the stationary central part, the gas bag no longer has to necessarily be constructed so as to be symmetrical to the rotation center of the steering device. As the orientation of the gas bag, unfolding from the stationary central part, is always the same, asymmetrical gas bag shapes with better restraint characteristics can be used.

The wiring of a gas bag module which is stationary in relation to the rotatable steering wheel part is, however, problematic compared with conventional steering wheels without a stationary central part, in which usually a so-called clock spring ensures the proper electrical connection between the rigid laced wiring harness on the steering arm and the electrical components rotatable with the steering wheel. In a steering device with a stationary gas bag module, on the other hand, in particular the supply lines to the gas generator must be guided through the rotatable steering wheel part.

There is a desire to provide a steering device with stationary central part, which offers the advantages of a fixed gas bag, but in which a simple and secure wiring of the gas bag module is made possible.

SUMMARY OF THE INVENTION

In accordance with a first aspect of the invention, a steering device comprises a steering wheel part coupled non-rotatably to a steering column, and a central part which is stationary with regard to a rotation of the steering wheel part. The steering device according to the invention further comprises a gas bag module including a gas generator unit, which in the installed state of the gas bag module is a component of the steering wheel part. Thus, in contrast to steering devices with stationary gas bag module known hitherto, the gas generator of the steering device according to the invention does not remain stationary together with the remaining gas bag module, but rather rotates with the steering wheel part. This makes it possible to provide a wiring of the gas generator as in conventional steering wheels without a stationary central part and with a single conventional clock spring. Therefore, a twisting of the supply lines can be ruled out. In accordance with the invention, despite the stationary central part, no additional expenditure is necessary for the wiring.

According to a second aspect the invention provides a vehicle steering device comprising a steering wheel part coupled non-rotatably to a steering column, and a central part which is stationary with respect to a rotation of the steering wheel part. A gas bag module including a gas generator unit is housed in the stationary central part. The gas generator unit is connected electrically via a supply line with a control unit arranged outside the steering device. According to the invention the supply line is guided from a first clock spring arranged in a stationary section of the steering device via a second clock spring arranged in the rotatable steering wheel part to the gas generator unit. According to this solution, the clock spring, which is usually used in conventional steering wheels without a rotatable central part for wiring, is supplemented by an additional clock spring, whereby a secure electric contacting of the gas generator unit is realized via the rotating section of the steering device. As the principle of the clock spring has proved to be successful over a long time, a high degree of reliability of functioning is ensured.

Advantageous and expedient developments of the steering device according to the invention, in particular with regard to an uncoupling of the gas generator unit from the gas bag module and a coupling to the steering wheel part, are indicated in the sub-claims.

Further features and advantages of the invention will be apparent from the following description of two example embodiments and from the enclosed drawings, to which reference is made.

DETAILED DESCRIPTION OF THE PREFERRED EMBODIMENTS

Figure 1:
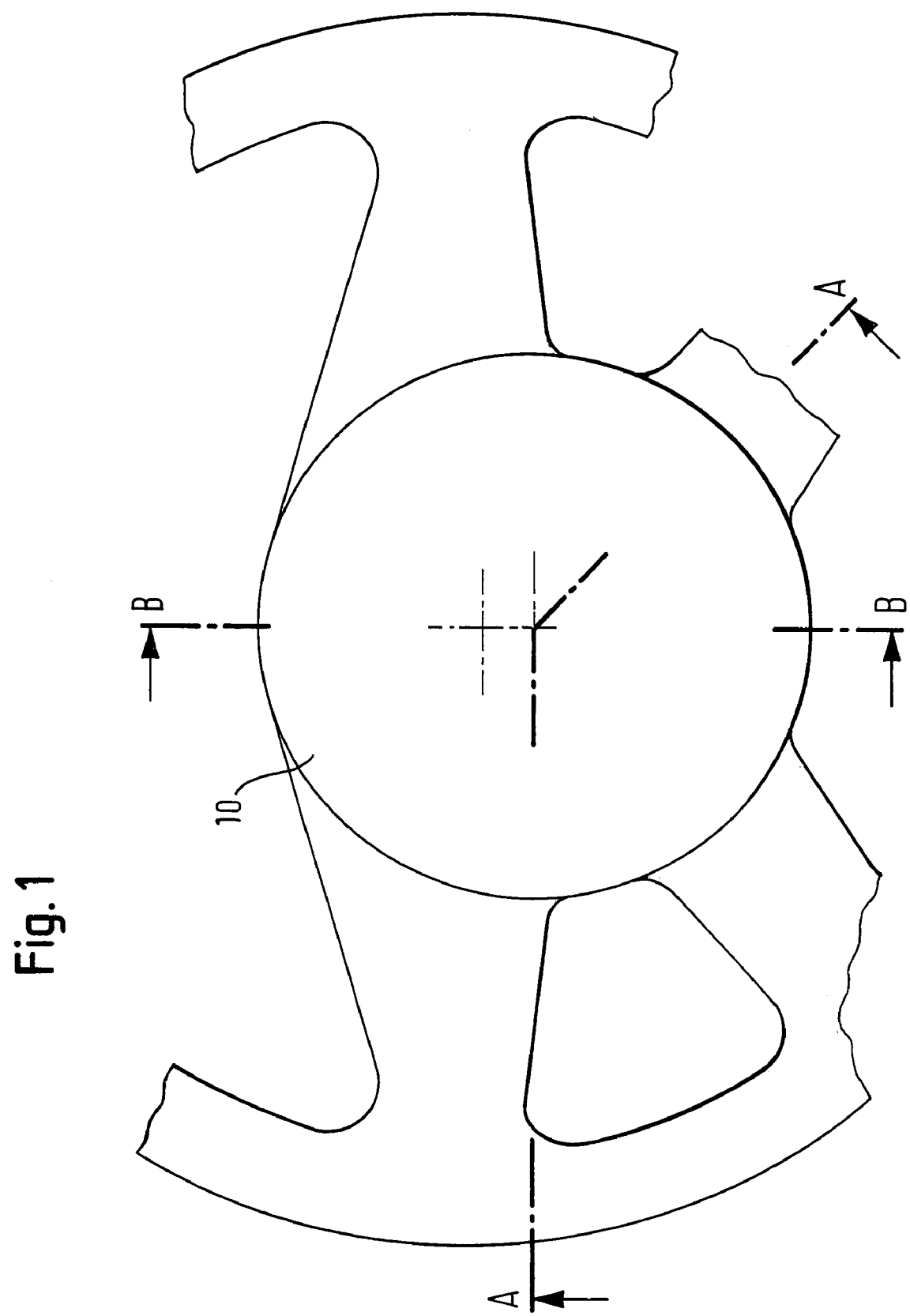
FIG. 1 shows a top view of a first steering device according to the invention.
Figure 2:
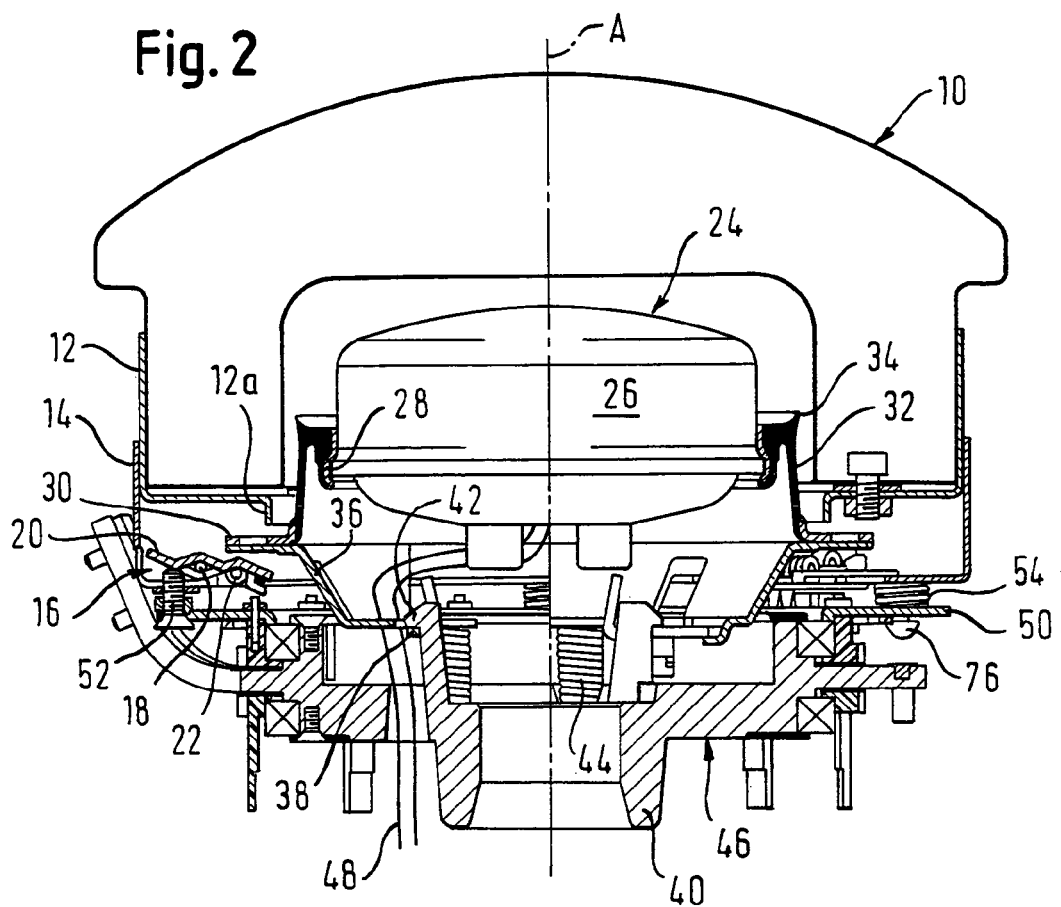
FIG. 2 shows a sectional view along the line A-A of FIG. 1.
Figure 3:
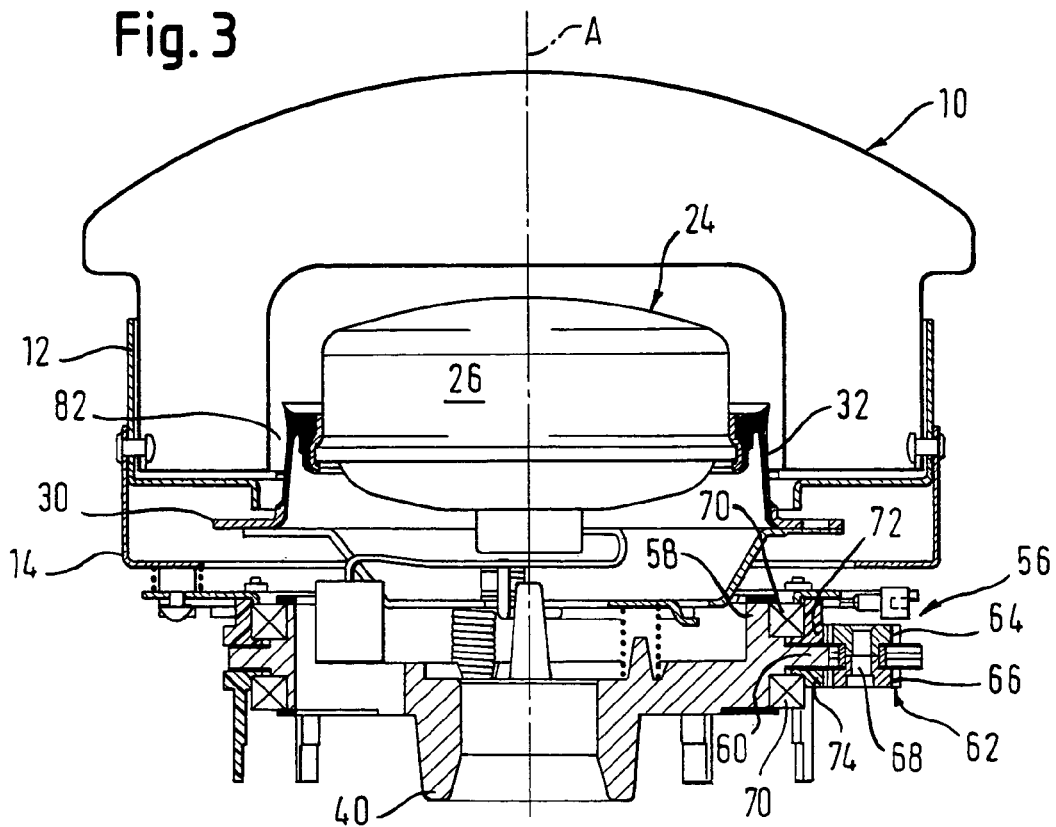
FIG. 3 shows a sectional view along the line B-B of FIG. 1.

In FIGS. 1 to 3, a steering device according to the invention is illustrated with an installed gas bag module 10. The gas bag module 10 comprises an assembly with a covering and a gas bag cage (not illustrated separately in FIGS. 2 and 3) and also a carrier plate 12 for fastening a gas bag (not shown) with an angled extension 12a and an outer carrier plate 14. Several locking arrangements 16 with a locking member 20 are coupled to the outer carrier plate 14. The function of the locking member 20, which is swivellable about an axis 18, is explained later. The locking member 20 is biased by a spring 22 in an anticlockwise direction with respect to the axis 18, according to the illustration of FIG. 2.

In addition, a gas generator unit 24 is provided with a gas generator 26, a mounting plate 28 and a ring-shaped mounting flange 30 and also with an elastic mounting cylinder 32 with external extensions 34. The free edges of the elastic mounting cylinder 32 are connected on the one hand with the mounting plate 28 and on the other hand with the mounting flange 30, so that the gas generator 26 undertakes the function of a vibration amortizer. A connecting plate 36, fastened to the mounting flange 30, on the underside of which radially displaceable spring elements 38 are provided, also belongs to the gas generator unit 24.

The steering device finally comprises a hub 40, connected non-rotatably to a steering column of the vehicle (not shown), with formed-on die-cast hooks 42 and axially arranged springs 44 in the interior of the hub 40. A steering wheel skeleton 46 is constructed in one piece with the hub 40. A supply line 48 (only indicated diagrammatically in FIG. 2) guided into the gas generator 26, by means of which the gas generator 26 is connected with a control unit arranged outside the steering device, is passed alongside the hub 40 out from the steering device and to a clock spring (not shown). A plate 50, in the outer region of which pins 52 are provided, is mounted so as to be rotatable with respect to the hub 40. Springs 54 are provided between the plate 50 and the outer carrier plate 14.

The entirety of the components coupled non-rotatably with the steering column is designated below as the steering wheel part.

In FIG. 3 a gearing unit 56 can be seen, the function of which is likewise explained later. In a skeleton section 60, connected with the hub 40 and extending radially away from an axial section 58, a double pinion part 62 is mounted. The double pinion part 62 has two pinions 64, 66 arranged in parallel, which are connected non-rotatably with each other by an axial section 68. On the outside of the axial skeleton section 58, two roller bearings 70 are arranged, one of which is arranged above and one below the horizontal skeleton section 60. The roller bearings 70 carry two toothings in the form of toothed rings 72, 74, which run completely around the central axis A of the steering device. The toothed rings 72, 74 are in engagement with the upper pinion 64 and with the lower pinion 66, respectively. The lower toothed ring 74 is mounted so as to be secure with the steering arm, whereas the upper toothed ring 72 is coupled to the gas bag module 10.

Figure 4A:
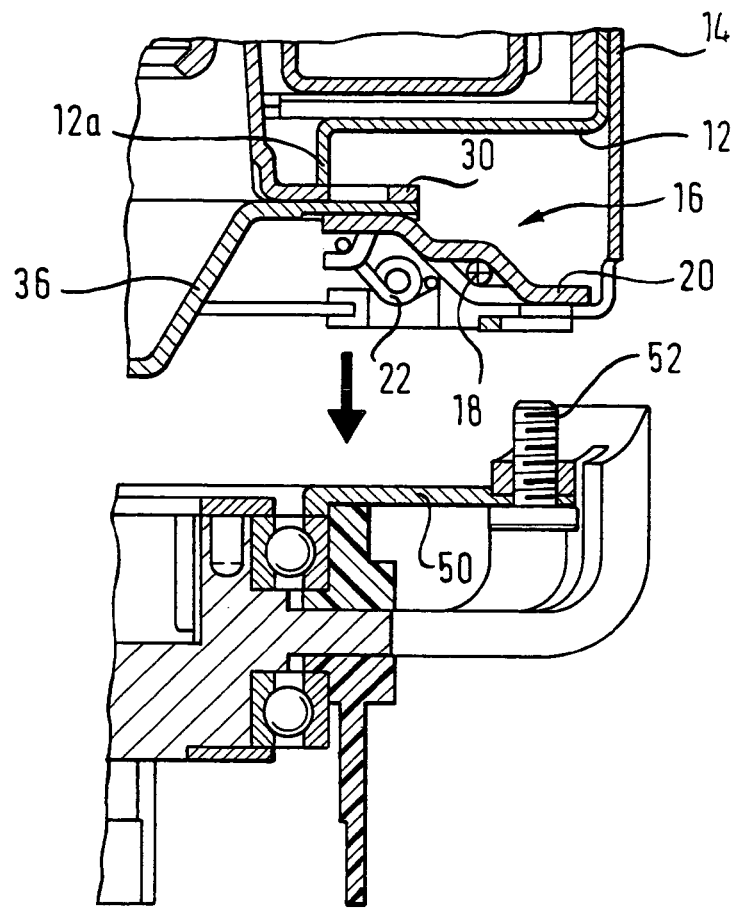
FIGS. 4a and 4b show enlarged detail views of the first steering device according to the invention before and after the installation of the gas bag module and FIG. 5 shows a sectional view of a second steering device according to the invention.
Figure 4B:
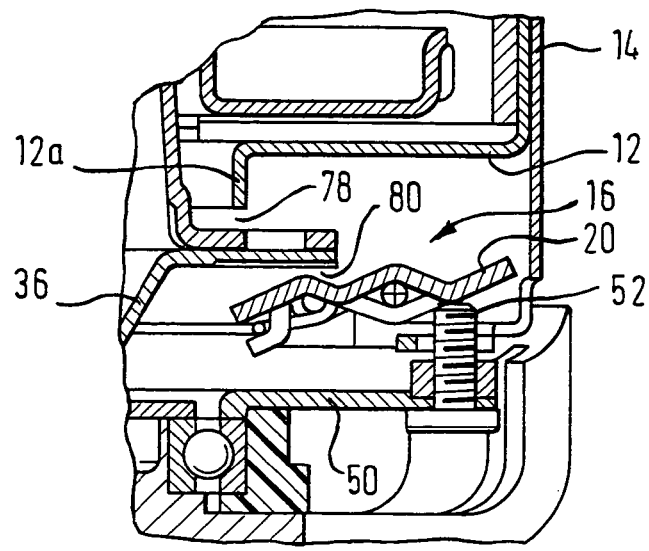

The installation of the gas bag module 10 is described below. Before installation, the gas generator unit 24 is a component of the gas bag module 10. As shown in FIG. 4a, the biased locking member 20 presses the connecting plate 36 with the mounting flange 30, fastened thereon, firmly against the extension 12a of the carrier plate 12, so that the gas generator unit 24 is held against the carrier plate 12. On insertion of the gas bag module 10 in the direction of the illustrated arrow, the gas bag module 10 is arrested in a conventional manner with the plate 50 by means of clip connections 76. During this process, the gas generator unit 24 is automatically transferred from the gas bag module 10 to the steering wheel part, as will be explained below.

On insertion, the gas bag module 10 is over-pressed against the force of the springs 54 to such an extent until through the pressure of the extension 12a onto the mounting flange 30 and the connecting plate 36, the spring elements 38 engage under the hooks 42 on the hub side. After the pressure onto the gas bag module 10 is discontinued, the springs 44 press the spring elements 38 securely against the hooks 42. At the same time, the springs 54 press the engaged gas bag module 10 upwards, so that a gap 78 occurs between the mounting flange 30 and the extension 12a. In addition, on insertion of the gas bag module 10, the locking member 20 is swivelled by the pin 52, serving as actuating member, against its biasing (anticlockwise in accordance with the illustration of FIG. 4a), so that a gap 80 also occurs between the locking member 20 and the connecting plate 36. Therefore, the gas generator unit 24 is uncoupled from the gas bag module 10 and is coupled non-rotatably to the hub 42 by means of the spring elements 38, i.e. the gas generator unit 24 is now a component of the steering wheel part. With a rotation of the steering wheel part, the supply line 48 is rotated together with the gas generator 26 and can therefore not become twisted.

So that the gas bag module 10 can remain stationary with respect to the gas generator unit 26, which is now rotatable with the steering wheel part, a gap 82 is provided between the elastic mounting cylinder 32 and the gas bag cage. The elastic mounting cylinder 32 with its external extensions 34 prevents the outflowing gases from flowing off downwards in an uncontrolled manner through this gap 82 on an activation of the gas generator 24, because the extensions 34 are pressed firmly against the gas bag cage by the outflowing gases and thus provide for a sufficient seal.

The relative movement of the steering wheel part with respect to the stationary gas bag module 10 is made possible by the gearing unit 56. The double pinion part 62 mounted on the radial skeleton section 60 is entrained with a rotary movement of the steering wheel part. As the lower toothed ring 74 is mounted so as to be secure with the steering arm, the lower pinion 66 runs on the lower toothed ring 74. The rotation of the lower pinion 66 is transferred to the upper pinion 64, connected non-rotatably via the axial section 68. Thereby, the upper toothed ring 72, with the gas bag module 10 coupled thereon, is rotated in the opposite direction to the direction of rotation of the steering wheel part, so that the gas bag module 10 effectively does not rotate with the steering wheel part, i.e. it remains stationary. The gas bag module 10 without the gas generator unit 24 therefore forms in the installed state a central part of the steering device which is stationary with respect to the steering wheel part.

Figure 5:
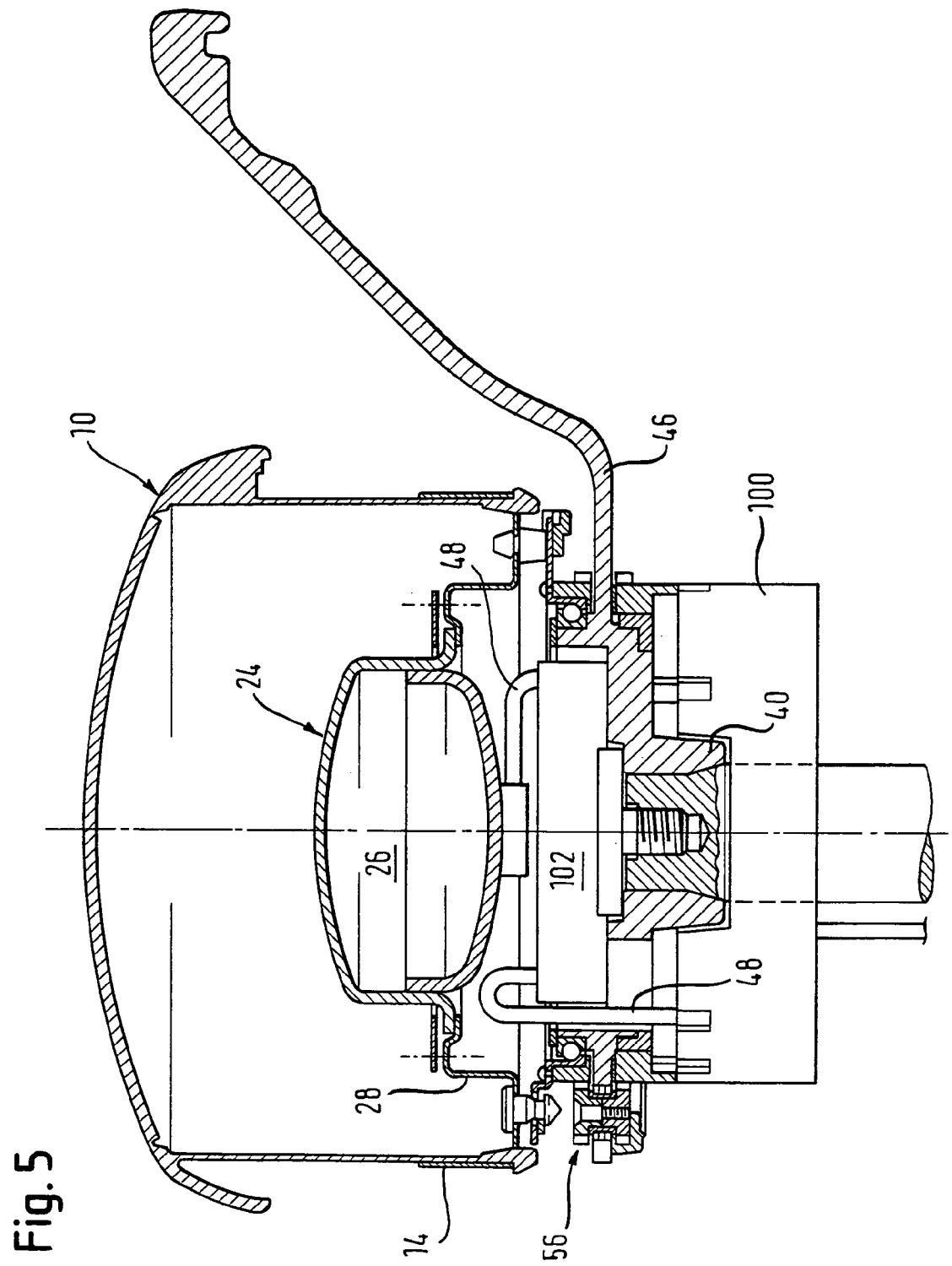

In FIG. 5 an alternative vehicle steering device according to the invention is illustrated, the same reference numbers being used as in FIGS. 1 to 3, in so far as they designate corresponding components.

The steering device corresponds largely to the steering device previously described with the difference that the gas generator unit 24 here is a fixed component of the gas bag module 10, i.e. is not passed on to the rotatable steering wheel part on installation of the gas bag module 10. Accordingly, with a rotation of the steering wheel part, the gas generator 26 does not rotate therewith. The problem of the wiring of the gas generator 26 is solved here by an auxiliary clock spring 100, which is provided in addition to a main clock spring 102.

The principle of the wiring of components, which are arranged on a conventional steering wheel without a stationary central part, by means of a clock spring, is sufficiently known and is therefore not explained in further detail here. As in the steering device illustrated in FIG. 5 the gas generator unit 24, however, belongs to the stationary central part of the steering wheel, such a wiring with only one clock spring is not expedient here.

The supply line 48 for the gas generator 26 is therefore guided from the main clock spring 102 arranged in a non-rotatable (stationary) section of the steering device, into the auxiliary wound spring 100 arranged in the rotatable steering wheel part, and from there into the gas generator 26. Of course, further supply lines for other steering wheel functional units, such as for instance a horn or multifunctional switch, can be laid in the same manner.

The invention claimed is:

1. A vehicle steering device, comprising
   a steering wheel part coupled non-rotatably to a steering column, and a central part which is stationary with regard to a rotation of the steering wheel part, the steering device comprises a gas bag module (10) including a gas generator unit (24), which in the installed state of the gas bag module (10) is a component of the steering wheel part, wherein the gas generator unit (24) rotates with said steering wheel part during rotation of said steering wheel part relative to said central part.

2. The steering device according to claim 1, wherein in the installed state the gas bag module (10) is a component of the stationary central part.

3. A vehicle steering device, comprising
a steering wheel part coupled non-rotatably to a steering column, and
a central part which is stationary with regard to a rotation of the steering wheel part,
wherein the steering device comprises a gas bag module (10) including a gas generator unit (24), which in the installed state of the gas bag module (10) is a component of the steering wheel part, wherein the gas bag module (10) and the gas generator unit (24) form a premounted assembly and that a mechanism is provided, by means of which the gas generator unit (24) can be uncoupled from the gas bag module (10) and coupled to the steering wheel part.

4. The steering device according to claim 3, wherein the mechanism is designed so that the uncoupling of the gas generator unit (24) from the gas bag module (10) and the coupling to the steering wheel part takes place automatically with an insertion of the gas bag module (10) into the steering device.

5. The steering device according to claim 3, wherein the mechanism comprises a locking arrangement (16) including a locking member (20) which is held between a locking position, in which the gas generator unit (24) is held against the gas bag module (10), and a release position, in which the gas generator unit (24) is released from the gas bag module (10).

6. The steering device according to claim 5, wherein the locking member (20) is arranged on an outer carrier plate (14) of the gas bag module (10) and in the locking position presses a mounting flange (30) of the gas generator unit (24) against an extension (12a) of a carrier plate (12) of the gas bag module (10).

7. The steering device according to claim 5, wherein the locking member (20) is biased into the locking position.

8. The steering device according to claim 5, wherein an actuating member (52) is provided, which on insertion of the gas bag module (10) moves the locking member (20) from the locking position into the release position.

9. The steering device according to claim 3, wherein the mechanism comprises at least one movable spring element (38) coupled to the gas generator unit (24), which is pressed firmly against a hook (42) of the steering wheel part for coupling the gas generator unit (24) to the steering wheel part after the insertion of the gas bag module (10).

10. The steering device according to claim 9, wherein the hook (42) is formed on the outer side of a steering wheel hub (40) and that the spring element (38) is arranged so as to be radially displaceable on a connecting plate (36) fastened with a mounting flange (30) of the gas generator unit (24).

11. A vehicle steering device, comprising a steering wheel part coupled non-rotatably to a steering column, and a central part which is stationary with respect to a rotation of the steering wheel part, a gas bag module (10) including a gas generator unit (24) being housed in the stationary central part, the gas generator unit (24) being connected electrically via a supply line (48) with a control unit arranged outside the steering device, wherein the supply line (48) is guided from a first clock spring (102) arranged in a stationary section of the steering device via a second clock spring (100) arranged in the rotatable steering wheel part to the gas generator unit (24).

12. The steering device according to claim 11, wherein in addition to the supply line (48) for the gas generator unit (24), further supply lines are provided for other steering wheel functional units, the further supply lines being likewise guided via the two clock springs (102,100).

13. The steering device according to claim 1, wherein between the steering wheel part and the central part, a gearing unit (56) is provided, which transfers a rotation of the steering wheel part in a first direction into a corresponding rotation of the central part in a second direction opposed to the first direction.

14. The steering device according to claim 13, wherein the gearing unit (56) comprises two pinions (64, 66) coupled non-rotatably with each other, the pinions (64, 66) engaging a first toothing (72) coupled to the gas bag module (10) and a second toothing (74) mounted so as to be secure with the steering arm, respectively.

15. The steering device according to claim 11, wherein between the steering wheel part and the central part, a gearing unit (56) is provided, which transfers a rotation of the steering wheel part in a first direction into a corresponding rotation of the central part in a second direction opposed to the first direction.

16. The steering device according to claim 15, wherein the gearing unit (56) comprises two pinions (64, 66) coupled non-rotatably with each other, the pinions (64, 66) engaging a first toothing (72) coupled to the gas bag module (10) and a second toothing (74) mounted so as to be secure with the steering arm, respectively.

* * * * *